United States Patent
Kuromi et al.

(10) Patent No.: US 8,780,533 B2
(45) Date of Patent: Jul. 15, 2014

(54) SOLID ELECTROLYTIC CAPACITOR AND METHOD FOR PRODUCING THE SAME

(75) Inventors: Hitoshi Kuromi, Kyoto-Fu (JP); Taro Ueno, Kyoto-Fu (JP); Koji Fujimoto, Kyoto-Fu (JP); Emi Matsushita, Kyoto-Fu (JP); Yoshihiro Koshido, Kyoto-Fu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 212 days.

(21) Appl. No.: 13/296,381

(22) Filed: Nov. 15, 2011

(65) Prior Publication Data
US 2012/0194968 A1 Aug. 2, 2012

(30) Foreign Application Priority Data
Jan. 28, 2011 (JP) .................. 2011-016762

(51) Int. Cl.
*H01G 9/00* (2006.01)
*H01G 9/04* (2006.01)
*H01G 9/145* (2006.01)
*H01G 5/38* (2006.01)

(52) U.S. Cl.
USPC ............ 361/528; 361/523; 361/532; 361/541

(58) Field of Classification Search
USPC .................. 361/523, 532, 528, 541
See application file for complete search history.

(56) References Cited

U.S. PATENT DOCUMENTS

| | | | | |
|---|---|---|---|---|
| 6,212,064 B1 * | 4/2001 | Aoki et al. | ..................... | 361/523 |
| 6,421,227 B2 * | 7/2002 | Nitoh et al. | ................... | 361/523 |
| 2008/0259526 A1 * | 10/2008 | Yoshida et al. | ............... | 361/523 |

FOREIGN PATENT DOCUMENTS

JP 4458470 2/2006

* cited by examiner

*Primary Examiner* — Eric Thomas
*Assistant Examiner* — Arun Ramaswamy
(74) *Attorney, Agent, or Firm* — Dickstein Shapiro LLP

(57) ABSTRACT

A solid electrolytic capacitor that includes a laminated body, a solid electrolyte layer, and conductive bases. The laminated body is obtained by laminating a plurality of dielectric-coated valve action metal sheets, each of which includes a valve action metal base and a dielectric coating, and joining together the adjacent valve action metal bases. The valve action metal base has a cathode layer part, and the dielectric coating covers the surface of the valve action metal base at least the cathode layer part. The valve action metal base of at least one of the dielectric-coated valve action metal sheets further has an anode lead part. The solid electrolyte layer is a continuous layer that fills gaps between the dielectric-coated valve action metal sheets and covers the outer surface of the laminated body at the cathode layer parts, and conductive bases are provided in the solid electrolyte layer.

9 Claims, 13 Drawing Sheets

SOLID ELECTROLYTIC CAPACITOR AND METHOD FOR PRODUCING THE SAME

BACKGROUND OF THE INVENTION

1. Field of the Invention

The present invention relates to a solid electrolytic capacitor and a method for producing the same.

2. Description of the Related Art

Electric or electronic devices are getting smaller and thinner, and therefore there is a demand for solid electrolytic capacitors with smaller size and larger capacitance. Further, from the viewpoint of electric characteristics in high-frequency bands and energy loss, solid electrolytic capacitors are required to have lower equivalent series resistance (hereinafter, sometimes abbreviated as "ESR").

In order to achieve low ESR, Japanese Patent No. 4458470 proposes a laminated solid electrolytic capacitor. The laminated solid electrolytic capacitor is obtained by joining together only anode parts (anode lead parts) of anode bodies, which are made of a valve action metal whose surface is covered with an oxide coating, by using a conductive paste or by welding to prepare a laminated body and then forming a conductive polymer layer (solid electrolyte layer) on cathode parts (cathode layer forming parts) of the anode bodies separated from the anode parts to connect together the cathode parts.

However, it cannot be necessarily said that such a conventional laminated solid electrolytic capacitor is adequate to respond to a request for lower ESR.

SUMMARY OF THE INVENTION

It is therefore an object of the present invention to provide a solid electrolytic capacitor having lower equivalent series resistance (ESR) and a method for producing such a solid electrolytic capacitor.

In order to achieve the above object, one aspect of the present invention is directed to a solid electrolytic capacitor comprising: a laminated body obtained by laminating a plurality of dielectric-coated valve action metal sheets, each of which includes a valve action metal base having a cathode layer forming part and a dielectric coating that covers a surface of the valve action metal base at least the cathode layer forming part and the valve action metal base of at least one of which further has an anode lead part, and joining together the adjacent valve action metal bases; a solid electrolyte layer formed as a continuous layer that fills a gap(s) between the dielectric-coated valve action metal sheets and covers an outer surface of the laminated body at the cathode layer forming parts of the valve action metal bases; and a conductive base(s) provided in the solid electrolyte layer that fills the gap(s) between the dielectric-coated valve action metal sheets.

In the case of the laminated solid electrolytic capacitor described in Japanese Patent No. 4458470 (see FIG. 1 in Japanese Patent No. 4458470), a gap(s) between dielectric-coated valve action metal sheets (corresponding to anode bodies in Japanese Patent No. 4458470) is (are) filled with only a solid electrolyte layer (corresponding to a conductive polymer layer in Japanese Patent No. 4458470), and therefore conductivity in the gap(s) is not sufficiently high, which results in high ESR. On the other hand, in the case of the solid electrolytic capacitor according to the present invention, a conductive base(s) is (are) provided in a solid electrolyte layer that fills a gap(s) between dielectric-coated valve action metal sheets, and therefore electric charge accumulated in cathode parts can be discharged through the conductive base(s). The conductive base(s) has (have) higher conductivity than the solid electrolyte layer, which makes it possible to reduce resistance at the cathode parts and therefore to provide a solid electrolytic capacitor having lower ESR. Further, according to the present invention, a relatively-thick cathode extraction layer(s) is (are) not provided between the dielectric-coated valve action metal sheets and the conductive base(s) provided between the dielectric-coated valve action metal sheets is (are) thin, which does not prevent a reduction in the thickness of a solid electrolytic capacitor and makes it possible to provide a solid electrolytic capacitor having large capacitance per unit volume.

In one embodiment of the solid electrolytic capacitor according to the present invention, the conductive base(s) may have at least one opening in which the adjacent valve action metal bases are joined together at their cathode layer forming parts, and a joint of the valve action metal bases may be electrically insulated from the solid electrolyte layer and the conductive base(s).

The above embodiment is particularly suitable for a two terminal-type solid electrolytic capacitor. A two terminal-type solid electrolytic capacitor has an anode provided on one end side thereof and a cathode provided on the other end side opposite to the one end side thereof. In the case of the solid electrolytic capacitor described in Japanese Patent No. 4458470, the dielectric-coated valve action metal sheets constituting a laminated body are joined together only at the anode lead parts of their valve action metal bases, and therefore the cathode layer forming part side of the laminated body tends to easily expand in the thickness direction of the solid electrolytic capacitor. On the other hand, according to the above embodiment of the solid electrolytic capacitor of the present invention, the valve action metal bases are jointed together at their cathode layer forming parts, and therefore the expansion of the cathode layer forming part side of the laminated body in the thickness direction of the solid electrolytic capacitor can be effectively prevented, which makes it possible to further increase the capacitance per unit volume of the solid electrolytic capacitor.

In one embodiment of the solid electrolytic capacitor according to the present invention, the conductive base(s) may be subjected to surface treatment for preventing oxidation.

By previously subjecting the conductive base(s) corresponding to a cathode part(s) to surface treatment, formation of an oxide coating on the surface of the conductive base(s) (for example, during use by a user) can be effectively prevented, which makes it possible to suppress or preferably prevent the formation of capacitance resulting from an oxide coating in the cathode part(s). Therefore, according to the above embodiment of the present invention, it is possible to lessen or preferably prevent a reduction in the capacitance of the solid electrolytic capacitor.

In one embodiment of the solid electrolytic capacitor according to the present invention, the conductive base(s) may have a plurality of openings and the openings may be filled with the solid electrolyte layer.

The capacitance of a solid electrolytic capacitor is reduced when dielectric-coated valve action metal sheets are not adequately covered with (or are in poor contact with) a solid electrolyte layer (for example, when air or the like is microscopically present between each dielectric-coated valve action metal sheet and a solid electrolyte layer and therefore they are in poor contact with each other). However, according to the above embodiment of the solid electrolytic capacitor of the present invention, since the conductive base(s) has (have)

a plurality of openings, a raw material solution of the solid electrolyte layer is allowed to easily enter the gap(s) between the dielectric-coated valve action metal sheets to fill the gap(s) with the solid electrolyte layer, and therefore the dielectric-coated valve action metal sheets can be adequately covered with the solid electrolyte layer. Therefore, the solid electrolytic capacitor according to the above embodiment of the present invention can have larger capacitance.

Another aspect of the present invention is directed to a method for producing a solid electrolytic capacitor (hereinafter, referred to as a "first production method") including the steps of: laminating a plurality of dielectric-coated valve action metal sheets, each of which includes a valve action metal base having a cathode layer forming part and a dielectric coating that covers a surface of the valve action metal base at least the cathode layer forming part and the valve action metal base of at least one of which further has an anode lead part, in such a manner that a conductive base(s) is (are) interposed between the adjacent dielectric-coated valve action metal sheets; joining together the adjacent valve action metal bases of the laminated dielectric-coated valve action metal sheets to obtain a laminated body of the dielectric-coated valve action metal sheets; and forming a solid electrolyte layer as a continuous layer that fills a gap(s) between the dielectric-coated valve action metal sheets (more specifically, gaps between the dielectric-coated valve action metal sheet and the conductive base) and covers an outer surface of the laminated body at the cathode layer forming parts of the valve action metal bases.

Yet another aspect of the present invention is directed to a method for producing a solid electrolytic capacitor (hereinafter, referred to as a "second production method") including the steps of: laminating a plurality of dielectric-coated valve action metal sheets each of which includes a valve action metal base having a cathode layer forming part and a dielectric coating that covers a surface of the valve action metal base at least the cathode layer forming part and the valve action metal base of at least one of which further has an anode lead part; joining together the adjacent valve action metal bases of the laminated dielectric-coated valve action metal sheets to obtain a laminated body of the dielectric-coated valve action metal sheets; forming a solid electrolyte layer on a surface of a conductive base(s); and inserting the conductive base(s) having the solid electrolyte layer formed on the surface thereof between the adjacent dielectric-coated valve action metal sheets of the laminated body.

Yet another aspect of the present invention is directed to a method for producing a solid electrolytic capacitor (hereinafter, referred to as a "third production method") including the steps of: forming a solid electrolyte layer on a surface of a conducive base(s); laminating a plurality of dielectric-coated valve action metal sheets, each of which includes a valve action metal base having an anode lead part and a cathode layer forming part and a dielectric coating that covers a surface of the valve action metal base at least the cathode layer forming part, in such a manner that the conductive base(s) having the solid electrolyte layer formed on the surface thereof is (are) interposed between the adjacent dielectric-coated valve action metal sheets; and joining together the adjacent valve action metal bases of the laminated dielectric-coated valve action metal sheets at their anode lead parts to obtain a laminated body of the dielectric-coated valve action metal sheets.

According to each of these first to third production methods of the present invention, it is possible to produce a solid electrolytic capacitor having the same effects as the above-described solid electrolytic capacitor according to the present invention.

In each of the first and second production methods according to the present invention, the conductive base(s) may have at least one opening in which the adjacent valve action metal bases are joined together at their cathode layer forming parts, and a joint of the valve action metal bases may be electrically insulated from the solid electrolyte layer and the conductive base(s).

Each of the first to third production methods according to the present invention may further include previously subjecting the conductive base(s) to surface treatment for preventing oxidation.

In each of the first to third production methods according to the present invention, the conductive base(s) may have a plurality of openings and the solid electrolyte layer may be formed so that the openings are filled with the solid electrolyte layer.

According to the present invention, it is possible to provide a solid electrolytic capacitor having lower equivalent series resistance (ESR) by providing a conductive base(s) in a solid electrolyte layer that fills a gap(s) between dielectric-coated valve action metal sheets. Further, according to the present invention, it is also possible to provide a method for producing such a solid electrolytic capacitor.

DETAILED DESCRIPTION OF THE INVENTION

First Embodiment

Hereinbelow, a solid electrolytic capacitor according to one embodiment of the present invention and a method for producing the same will be described with reference to the accompanying drawings.

Figure 1A:
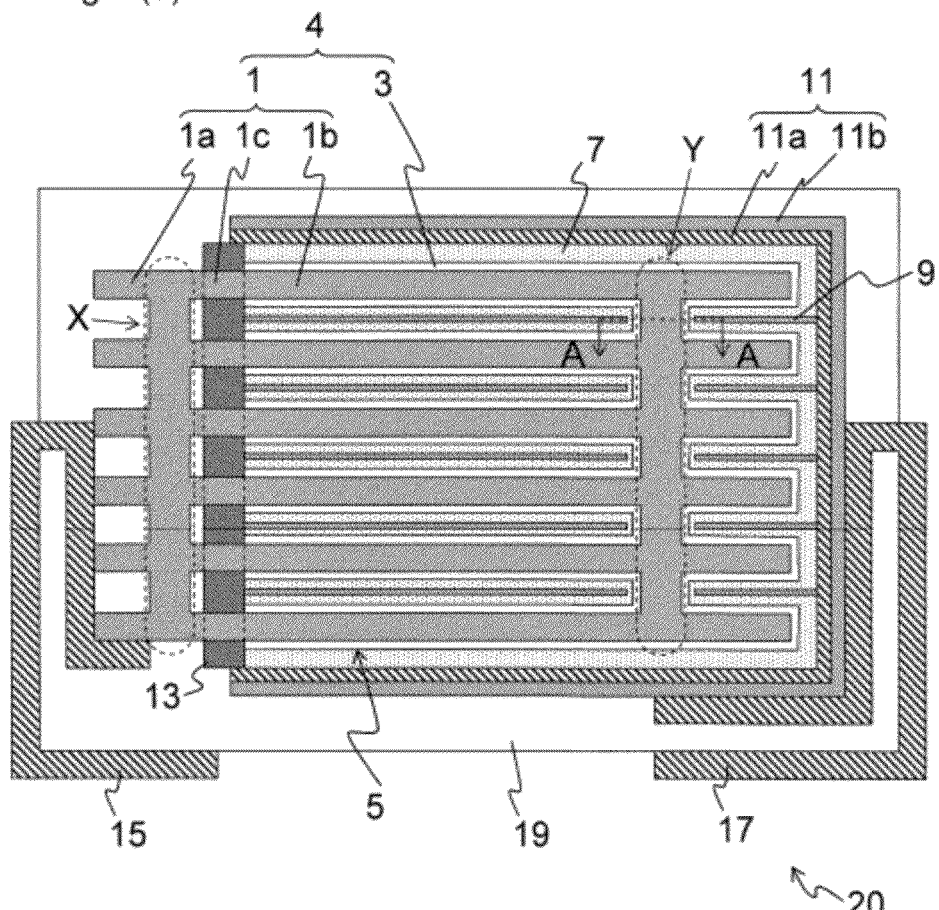
FIG. 1(a) is a schematic sectional view of a solid electrolytic capacitor according to one embodiment of the present invention.

As schematically shown in FIG. 1(a), a solid electrolytic capacitor 20 according to this embodiment includes a laminated body 5, a solid electrolyte layer 7, and conductive bases 9. The laminated body 5 is obtained by laminating a plurality of dielectric-coated valve action metal sheets 4 each including a valve action metal base 1 and a dielectric coating 3 (in the case of this embodiment shown in FIG. 1(a), the number of the dielectric-coated valve action metal sheets 4 is 6, but is not limited thereto) and joining together the adjacent valve action metal bases 1 at joints X and Y. More specifically, the valve action metal base 1 has an anode lead part 1a and a cathode layer forming part 1b. However, the solid electrolytic capacitor according to the present invention is not limited to this embodiment as long as the valve action metal base 1 of at least one of the dielectric-coated valve action metal sheets 4 has not only the cathode layer forming part 1b but also the anode lead part 1a.

The surface of the valve action metal base 1 is covered with the dielectric coating 3 at least the cathode layer forming part 1b. According to this embodiment, the anode lead part 1a and the cathode layer forming part 1b are separated by an insulating member 13 formed at a separating part 1c located between the anode lead part 1a and the cathode layer forming part 1b. The solid electrolyte layer 7 is a continuous layer that fills the gaps between the dielectric-coated valve action metal sheets 4 and covers the outer surface of the laminated body 5 at the cathode layer forming parts 1b of the valve action metal bases 1. The conductive bases 9 are provided in the solid electrolyte layer 7 that fills the gaps between the dielectric-coated valve action metal sheets 4 (in other words, the gaps between the dielectric-coated valve action metal sheet 4 and the conductive base 9 are filled with the solid electrolyte layer 7). In addition, the solid electrolytic capacitor 20 according to this embodiment further includes a cathode extraction layer 11 (including a carbon-containing layer 11a and a silver-containing layer 11b) that covers the outer surface of the solid electrolyte layer 7, an anode terminal 15, a cathode terminal 17, and an insulating resin 19, but they are not essential to the present invention.

According to this embodiment, each of the valve action metal bases 1 can be virtually separated into the anode lead part 1a, the cathode layer forming part 1b, and the separating part 1c located between them. The valve action metal bases 1 are joined together at the joints X and Y. In each of the valve action metal bases 1 of FIG. 1(a), the surface of the cathode layer forming parts 1b (including the surface of the joint Y) is shown as being covered with the dielectric coating 3, but the surface of the anode lead part 1a and the separating part 1c may also be fully or partially covered with the dielectric coating 3 or may not be covered with the dielectric coating 3 at all.

In the laminated body 5, the valve action metal bases 1 are electrically connected to one another through the joints X and Y. In the case of the embodiment shown in FIG. 1(a), one of the joints X is present at the anode lead parts 1a of the valve action metal bases 1, and the other joint Y is present at the cathode layer forming parts 1b of the valve action metal bases. The positions of the joints X and Y and the number of the joints are not particularly limited, and can be appropriately set to meet the requirements of the solid electrolytic capacitor to be produced. However, at least one joint is preferably present at the cathode layer forming parts 1b of the valve action metal bases. The cross-section of each of the joints X and Y taken along the A-A line may have any suitable shape such as a circle, an ellipse, a rectangle, or a square.

Figure 1B:
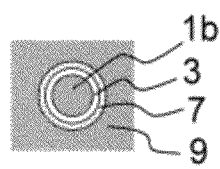
FIG. 1(b) is a schematic top view of the solid electrolytic capacitor virtually taken along the A-A line in FIG. 1(a)

The conductive bases 9 are provided in the solid electrolyte layer 7 that fills the gaps between the dielectric-coated valve action metal sheets 4 at the cathode layer forming parts 1b of the valve action metal bases 1. The valve action metal bases 1 are covered with the dielectric coating 3 at their cathode layer forming parts 1b, and therefore the valve action metal bases 1 are electrically insulated from the solid electrolyte layer 7 and the conductive bases 9. Particularly, as can be seen from FIG. 1(b) that shows the joint Y and its vicinity, the surface of the joint Y is covered with the dielectric coating 3 and therefore the joint Y of the valve action metal bases 1 is electrically insulated from the solid electrolyte layer 7 and the conductive bases 9 (in the case of the embodiment shown in FIG. 1(a), the joint Y has a circular cross-section taken along the A-A line and each of the conductive bases 9 has a circular opening concentric with the joint Y, but the cross-section form of join Y and the opening form of conductive bases 9 are not limited thereto).

The solid electrolytic capacitor 20 according to this embodiment can achieve low ESR because the conductive bases 9 are provided in the solid electrolyte layer 7 that fills the gaps between the dielectric-coated valve action metal sheets 4. Further, the solid electrolytic capacitor 20 according to this embodiment uses not relatively-thick cathode extraction layers but thin conductive bases as charge-emitting media to be provided in the gaps between the dielectric-coated valve action metal sheets 4, and therefore the space saved by reducing the thickness of charge-emitting media can be efficiently utilized and large capacitance per unit volume can be achieved.

Hereinbelow, three different methods for producing the solid electrolytic capacitor according to this embodiment will be described. First and second production methods will be described with reference to a case where the solid electrolytic capacitor 20 shown in FIG. 1 is produced, and a third production method will be described with reference to a case where a modified example of the solid electrolytic capacitor 20 shown in FIG. 1 (wherein the joint Y is omitted) is produced.

(First Production Method)

The first production method for producing the solid electrolytic capacitor will be described with reference to FIGS. 2A to 2D. In FIGS. 2A to 2D, the same reference numerals as those in FIG. 1 denote the same elements as described above with reference to the solid electrolytic capacitor 20.

First, the dielectric-coated valve action metal sheets 4 each including the valve action metal base 1 and the dielectric coating 3 that covers the surface of the valve action metal base 1 at least the cathode layer forming part 1b are prepared. More specifically, the dielectric-coated valve action metal sheets 4 can be prepared in the following manner.

The valve action metal base 1 is substantially made of a metal material having so-called valve action. Such a metal material is selected from, for example, the group consisting of aluminum, tantalum, niobium, titanium, zirconium, and alloys of two or more of them. Among them, aluminum or an alloy containing aluminum is preferred.

The valve action metal base 1 can have a sheet (or plate) form (e.g., a foil). The thickness of the valve action metal base 1 is not particularly limited, but is, for example, 50 to 200 μm, preferably 90 to 130 μm. The width and length of the valve action metal base 1 can be appropriately selected according to the size of the solid electrolytic capacitor to be produced.

Particularly, the valve action metal base 1 preferably has surface irregularities, and more preferably has, for example, a porous surface layer. This is because the valve action metal base 1 functions as an anode in the solid electrolytic capacitor, and therefore even when the area of space occupied by the valve action metal bases 1 is the same, the capacitor can have larger capacitance when the valve action metal bases 1 have a larger surface area, that is, a larger effective area. Such a valve action metal base 1 having surface irregularities or a porous surface layer can be obtained by previously subjecting the valve action metal base 1 to surface roughening treatment. The surface roughening treatment is generally performed by etching. The conditions of etching, such as the type of etching solution used, etching temperature, and etching time, can be appropriately selected depending on the type of metal material of the valve action metal base used or desired electric characteristics (including the effective area). For example, the etching solution may be hydrochloric acid.

The dielectric coating 3 is formed on the surface of the valve action metal base 1. The dielectric coating 3 may be an oxide coating formed by anode oxidation (which is also referred to as "chemical conversion coating", and the same goes for the following) performed by immersing at least the cathode layer forming part 1b of the valve action metal base 1 in an electrolytic solution. The conditions of anode oxidation, such as the type of electrolytic solution used and the temperature, time, current density, and voltage of anode oxidation, can be appropriately selected depending on the type of metal material of the valve action metal base used and desired electric characteristics. For example, the electrolytic solution may be a solution containing at least one selected from the group consisting of boric acid, phosphoric acid, adipic acid, and their sodium salts and ammonium salts.

In this way, the dielectric-coated valve action metal sheets 4 each including the valve action metal base 1 and the dielectric coating 3 that covers the surface of at least the cathode layer forming part 1b of the valve action metal base 1 are prepared. The thickness, width, and length of each of the dielectric-coated valve action metal sheets 4 are substantially the same as those of the valve action metal base 1 used (usually, the thickness of the dielectric coating is of the order of nanometers and is therefore negligible as compared to the size of the valve action metal base 1) and can be appropriately selected depending on the size of the solid electrolytic capacitor to be produced.

It is to be noted that a dielectric-coated valve action metal sheet for solid electrolytic capacitor which is formed by roughening the surface of a valve action metal base by etching and forming a dielectric coating (oxide coating) on the valve action metal base by anode oxidation is commercially available. The cut pieces of such a commercially-available dielectric-coated valve action metal sheet may be used as the dielectric-coated valve action metal sheets 4.

Then, the insulating member 13 is formed so as to cover the separating part 1c (which may or may not be covered with the dielectric coating) of the valve action metal base 1 of each of the dielectric-coated valve action metal sheets 4 prepared in such a manner as described above to separate the anode lead part 1a and the cathode layer forming part 1b from each other.

The insulating member 13 can be formed using an insulating resin. Specific examples of the insulating resin include polyphenylsulfone (PPS), polyethersulfone (PES), cyanic acid ester resins, fluorine resins (e.g., tetrafluoroethylene, tetrafluoroethylene-perfluoroalkylvinylether copolymers), low-molecular-weight polyimides, and their derivatives and precursors. Among them, low-molecular-weight polyimides, polyethersulfone, fluorine resins, and their precursors are particularly preferred.

It is to be noted that the insulating member 13 may be formed at any suitable timing or may be formed in several steps as long as the anode lead parts 1a of the valve action metal bases are exposed to the outside in a state where they are electrically insulated from the solid electrolyte layer 7 and the cathode extraction layer 11.

Figure 2A:
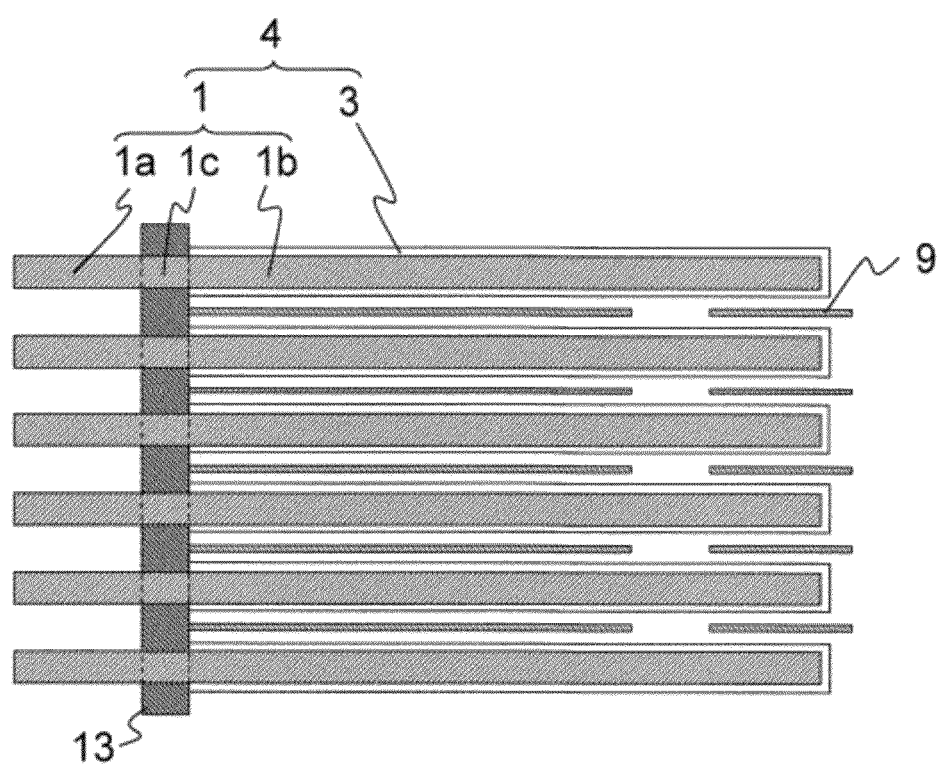
FIG. 2A is a diagram for explaining a step of a first method for producing the solid electrolytic capacitor according to the embodiment of the present invention.

Then, as shown in FIG. 2A, the dielectric-coated valve action metal sheets 4 are laminated one after another in such a manner that the conductive bases 9 are interposed between the adjacent dielectric-coated valve action metal sheets 4.

The conductive bases 9 may or may not be in contact with the insulating member 13 as long as they are interposed between the adjacent dielectric-coated valve action metal sheets 4 at positions corresponding to the cathode layer forming parts 1b of the valve action metal bases 1. Each of the conductive bases 9 has an opening (for joint) at a position corresponding to the joint Y.

The conductive bases 9 are not particularly limited as long as they have higher conductivity than the solid electrolyte layer, and are substantially made of, for example, a metal material or a metal material-containing composite material. Each of the conductive bases 9 is not limited to a sheet-shaped one, and may be formed into a mesh, a woven fabric, or a nonwoven fabric. As the metal material, any suitable metal having higher conductivity than the solid electrolyte layer may be used. A metal on the surface of which substantially no dielectric oxide coating is formed in an environment where the capacitor is used (e.g., gold) can be used as it is. A metal on the surface of which a dielectric oxide coating may be formed in an environment where the capacitor is used (e.g., aluminum) is preferably subjected to treatment for preventing the formation of a dielectric oxide coating on its surface before use in such a manner as described below. The conductive base previously subjected to such treatment may be made of a composite material containing a metal material. Such a conductive base is, for example, a metal foil coated with carbon, preferably an aluminum foil coated with carbon.

As described above, each of the conductive bases 9 is formed into a sheet (or a plate) (e.g., a foil) and has an opening (for joint) at least a position corresponding to the joint Y. Each of the conductive bases 9 may further have a plurality of openings (not for joint) other than the opening provided at a position corresponding to the joint Y (which will be described later). The thickness of each of the conductive bases 9 is not particularly limited as long as low ESR can be achieved, but is, for example, 5 to 110 μm, preferably 10 to 30 μm. The width and length of each of the conductive bases 9 can be appropriately selected depending on the size of the solid electrolytic capacitor to be produced. Each of the conductive bases 9 may be smaller than the cathode layer forming part 1b, but preferably has an outer shape that is the same as or similar to that of the cathode layer forming part 1b.

As described above, the conductive bases 9 are preferably subjected to surface treatment for preventing oxidation in advance. Examples of such surface treatment include formation of a carbon-containing layer by applying a carbon paste onto the surface of the conductive base 9 and drying the carbon paste and fixation of carbon onto the surface of the conductive base 9 by using whisker.

Unlike the valve action metal base 1, the conductive base 9 is preferably not subjected to surface roughening treatment from the viewpoint of obtaining high electrical conductivity.

The size of each gap between the laminated dielectric-coated valve action metal sheets 4, more specifically, the size of each gap between the dielectric coating 3 and the conductive base 9 is not particularly limited as long as a raw material solution of conductive polymer constituting the solid electrolyte layer 7 can enter the gap in a step which will be described later.

In a case where the valve action metal base 1 has a surface subjected to surface roughening (for forming surface irregularities) by, for example, the above-described etching (preferably a porous surface layer), gaps are naturally formed simply by alternately stacking the dielectric-coated valve action metal sheets 4 and the conductive bases 9.

Further, as shown in FIG. 2A, in a case where the insulating member 13 is located between the dielectric-coated valve action metal sheets 4, gaps are naturally formed between the dielectric-coated valve action metal sheets 4 by the insulating member 13. In this case, the dielectric-coated valve action metal sheets 4 can also be fixed to one another by the insulating member 13 (i.e., temporarily fixed to one another before a joint is formed in a later step). More specifically, an insulating resin is applied to each of the dielectric-coated valve action metal sheets 4 separately, and then the dielectric-coated valve action metal sheets 4 are stacked on top of another, and then the insulating resin is solidified or cured by, for example, heating to form the insulating member 13. The thus formed insulating member 13 makes it possible to fix the dielectric-coated valve action metal sheets 4 to one another. Further, when the insulating member 13 is formed in such a manner that the insulating resin is applied also onto the tips of the conductive bases 9, the conductive bases 9 can also be fixed by the insulating member 13 at their tips.

According to this embodiment, a plurality of the laminated dielectric-coated valve action metal sheets 4 have substantially the same length, and the anode lead parts 1a, the cathode layer forming parts 1b, and the separating parts 1c of their valve action metal bases 1 also have substantially the same length, respectively.

Figure 2B:
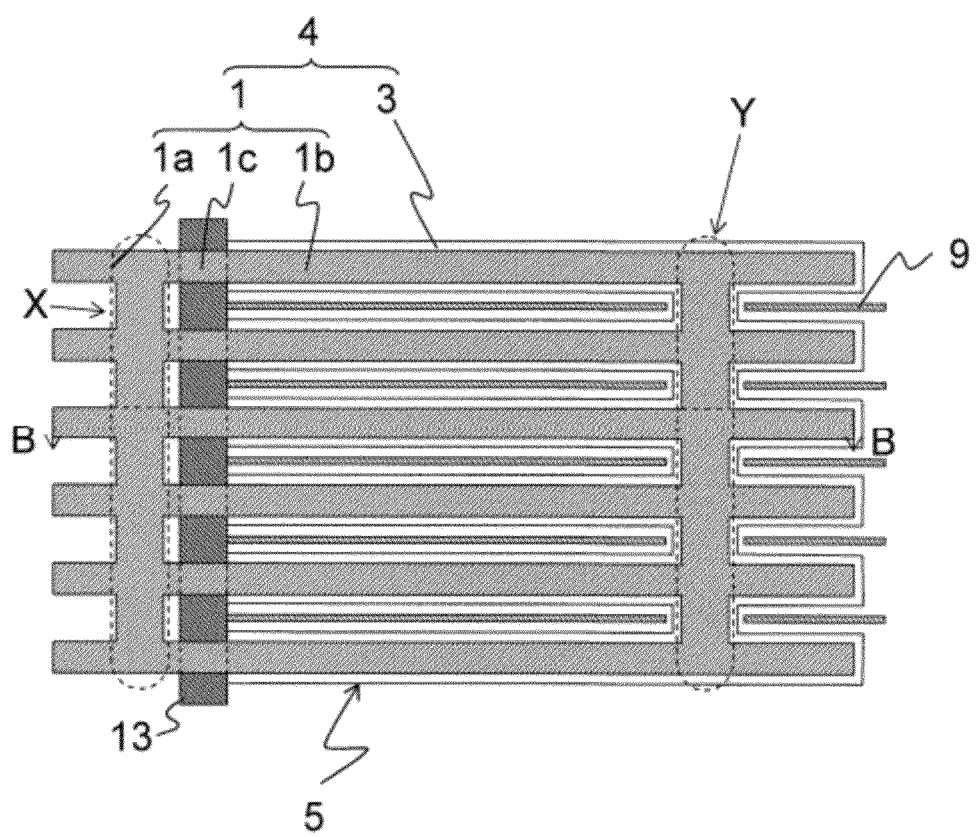
FIG. 2B is a diagram for explaining a step of the first method for producing the solid electrolytic capacitor according to the embodiment of the present invention.

Then, as shown in FIG. 2B, the adjacent valve action metal bases 1 of the laminated dielectric-coated valve action metal sheets 4 are joined together at the joints X and Y to obtain the laminated body 5 of the dielectric-coated valve action metal sheets 4. More specifically, the laminated dielectric-coated valve action metal sheets 4 are subjected to any suitable treatment to melt the valve action metal bases 1 in a predetermined region so that molten metals derived from the adjacent valve action metal bases 1 are brought into direct contact with each other and integrated into one by surface tension or the like, the integrated molten metal is solidified, and thus the joints X and Y are formed. In the predetermined region, the dielectric coating 3 may have an opening previously formed (that is, the valve action metal base 1 may be exposed), but is not limited thereto.

The treatment for forming the joints is not particularly limited as long as the valve action metal bases can be molten, and may be, for example, heating, but is preferably welding capable of electrically and mechanically joining the adjacent valve action metal bases 1 together. Examples of such welding include resistance welding, laser welding, and ultrasonic welding, and these methods may be used singly or in combination of two or more of them.

According to this embodiment, the two joints X and Y are formed. When two or more joints are formed, the positions thereof can be appropriately selected, but the joints are preferably formed at such positions that the valve action metal bases 1 are joined together with substantially equal force.

Figure 2C:
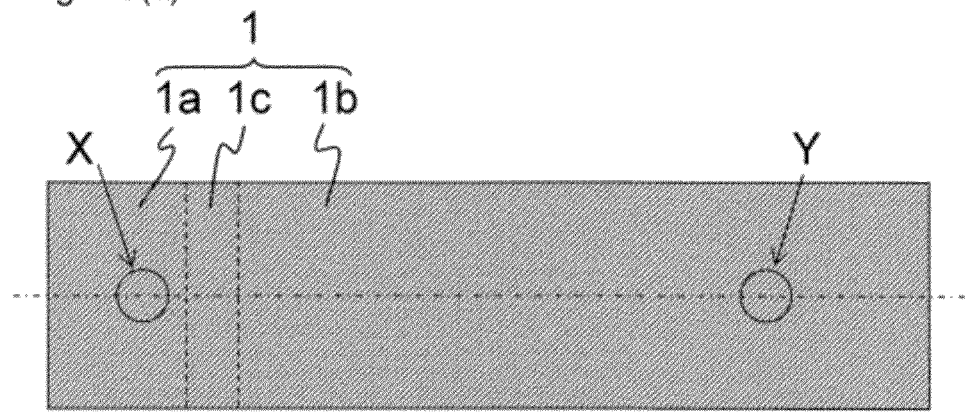
FIGS. 2C(a) and 2C(b) are diagrams for explaining the first method for producing the solid electrolytic capacitor according to the embodiment of the present invention, wherein FIG. 2C(a) is a schematic top view of a laminated body virtually taken along the B-B line in FIG. 2B and FIG. 2C(b) is a schematic top view of a modified example of the laminated body shown in FIG. 2C(a)
Figure 2C:
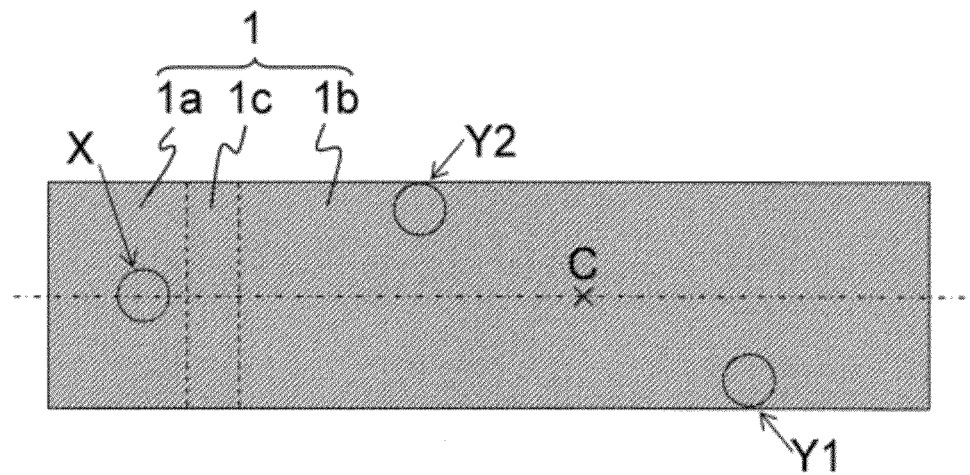

The joint X is formed at the anode lead parts 1a of the valve action metal bases 1. As shown in FIGS. 2C(a) and 2C(b), When being formed at the anode lead parts 1a, the joint X is preferably located on or near a line bisecting the width of the anode lead part 1a (indicated by an alternate long and short dashed line in FIGS. 2C(a) and 2C(b)). This is because stress applied to the entire dielectric-coated valve action metal sheets can be evenly distributed and therefore the solid electrolytic capacitor to be produced is more electrically and mechanically stabilized. More specifically, the area of the joint X is preferably 0.1% or more, more preferably 1% or more of the area of the anode lead part 1a depending on the area ratio between the anode lead part 1a and the cathode layer forming part 1b. When the area of the joint X is 0.1% or more of the area of the anode lead part 1a, it is possible to obtain necessary and sufficient mechanical joint strength and electrical conductivity (continuity). When two or more joints are formed at the anode lead parts 1a, the area of each of the joints is preferably 0.1% or more, more preferably 1% or more of the area of the anode lead part 1a.

On the other hand, the joint Y is formed at the cathode layer forming parts 1b of the valve action metal bases 1. When the joint Y is formed at the cathode layer forming parts 1b, as shown in, for example, FIG. 2C(a), the joint Y may be formed on or near the line bisecting the width of the cathode layer forming part 1b (indicated by an alternate long and short dashed line in FIG. 2C(a)). Such placement of the joint is suitable when the joint is formed by resistance welding. According to this embodiment, as shown in FIGS. 2B and 2C(a), the position of the joint Y is displaced from the center of the cathode layer forming part 1b along the longitudinal direction so as to be distal to the anode lead part 1a so that the valve action metal bases 1 can be joined together with substantially equal force at the joints X and Y. Alternatively, according to a modified example of this embodiment, as shown in, for example, FIG. 2C(b), a pair of joints Y1 and Y2 may be formed at positions substantially symmetric with respect to the center C of the cathode layer forming part 1b. Such placement of the joints is suitable when the joints are formed by laser welding. The placement of the joint Y and the placement of the joints Y1 and Y2 are both preferred because stress applied to the entire dielectric-coated valve action metal sheets can be equally distributed, the solid electrolytic capacitor to be produced can be more electrically and mechanically stabilized, and an increase in equivalent series resistance (ESR) can be prevented. When a joint is formed at the cathode layer forming parts 1b, capacitance corresponding to the joint is lost as compared to a case where a joint is not formed at the cathode layer forming parts 1b. Particularly, as compared to a case where the surface of a portion where a joint is to be formed is also roughened by etching to increase the effective area, surface irregularities thereof are removed (pores are closed) by forming a joint, and therefore larger capacitance is lost even when the area of the joint is the same.

Therefore, the area of the joint is preferably minimized while electrical connection is ensured. More specifically, the area of the joint Y is preferably 1% or more, more preferably 5% or more of the area of the cathode layer forming part 1b but is preferably 30% or less, more preferably 20% or less of the area of the cathode layer forming part 1b. When the area of the joint Y is 1% or more of the area of the cathode layer forming part 1b, the adjacent valve action metal bases 1 can be joined together while being electrically and mechanically stabilized. This makes it possible to prevent disconnection of the joint when the solid electrolyte layer is formed as a cathode layer in a later step while ensuring electrical connection. On the other hand, when the area of the joint Y is 30% or less of the area of the cathode layer forming part 1b, the capacitance of the solid electrolytic capacitor is not excessively lost, which eliminates the need to increase the number of the laminated dielectric-coated valve action metal sheets 4 to compensate for the loss of capacitance. When two or more joints (e.g., joints Y1 and Y2 shown in FIG. 2C(b)) are formed at the cathode layer forming parts 1b, the area of each of these joints is preferably 1% or more, more preferably 5% or more of the area of the cathode layer forming part 1b, and the total area of these joints is preferably 30% or less, more preferably 20% or less of the area of the cathode layer forming part 1b.

The above description about the position and size of the joint Y and the number of the joints Y is equally applicable to the opening of the conductive base 9 provided at a position corresponding to the joint Y. The form of the opening of the conductive base 9 is determined depending on the form of the joint Y, and the opening of the conductive base 9 can have any suitable form such as a circle, an ellipse, a rectangle, or a square.

When the surface of the joint of the valve action metal bases 1 is covered with the dielectric coating 3 after the valve action metal bases 1 are joined together, the joint of the valve action metal bases 1 is electrically insulated from the solid electrolyte layer 7 (which is formed in a later step) and the conductive bases 9 by the dielectric coating 3. On the other hand, when the valve action metal bases 1 are exposed at the surface of the joint, another operation is performed to electrically insulate the joint from the solid electrolyte layer 7 and the conductive bases 9. For example, there is a case where, after the valve action metal bases 1 are joined together, the valve action metal bases 1 are exposed at the side surface of the dielectric-coated valve action metal sheets 4, the two main surfaces (i.e., upper and lower surfaces) of the laminated body 5, and the gaps between the dielectric-coated valve action metal sheets 4. Particularly, if the exposed valve action metal bases 1 and the solid electrolyte layer 7 and/or the conductive bases 9 are brought into contact with each other at the cathode layer forming parts 1b of the valve action metal bases 1, there is a possibility that the solid electrolytic capacitor shorts out. Therefore, at least the cathode layer forming parts 1b are preferably subjected to anode oxidation treatment after the formation of the laminated body 5 to cover the cathode layer forming parts 1b of the exposed valve action metal bases 1 with a dielectric coating to insulate them from the solid electrolyte layer 7 and the conductive bases 9. The conditions of such additional anode oxidation treatment may be the same as those described above.

In this way, the laminated body 5 is obtained, in which the adjacent valve action metal bases 1 of the laminated dielectric-coated valve action metal sheets 4 are joined together.

Figure 2D:
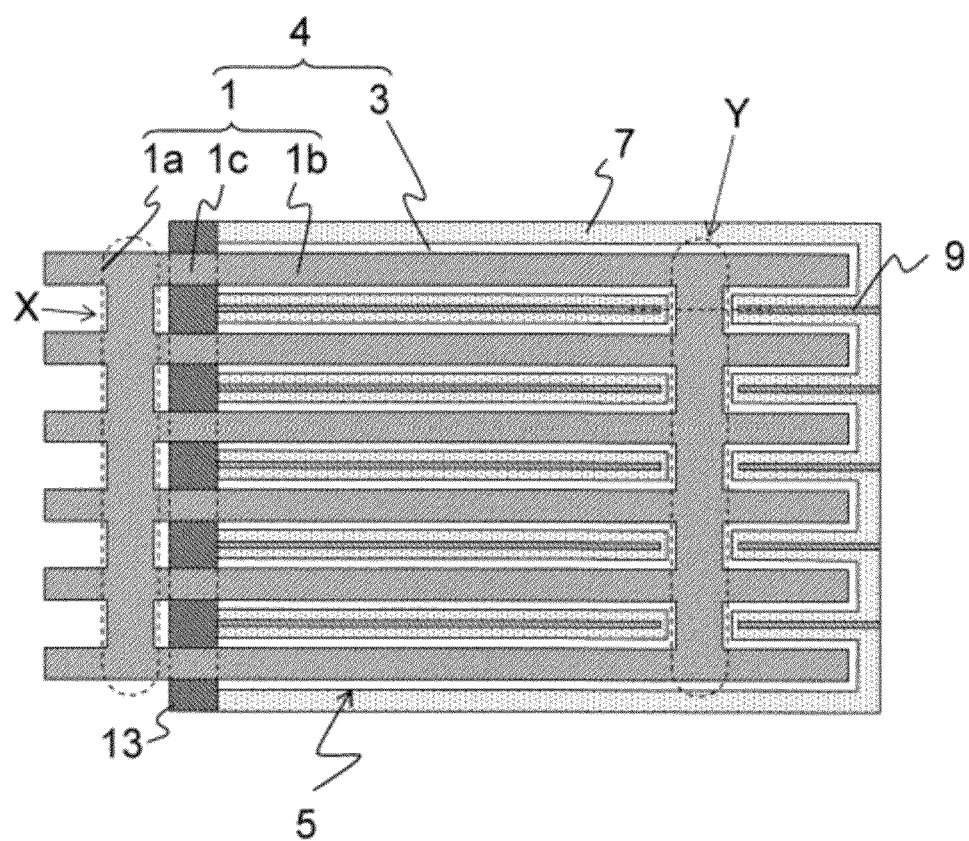
FIG. 2D is a diagram for explaining a step of the first method for producing the solid electrolytic capacitor according to the embodiment of the present invention.

Then, as shown in FIG. 2D, the solid electrolyte layer 7 is formed as a continuous layer so that the gaps between the dielectric-coated valve action metal sheets 4 are filled with the solid electrolyte layer 7 and the outer surface of the laminated body 5 is covered with the solid electrolyte layer 7 at the cathode layer forming parts 1b of the valve action metal bases 1. The anode lead parts 1a of the valve action metal bases 1 are left exposed without filling the gaps between the anode lead parts 1a with the solid electrolyte layer 7 and without covering the surface of the anode lead parts 1a with the solid electrolyte layer 7.

Such a solid electrolyte layer 7 can be formed by forming a continuous layer made of a conductive polymer in the gaps between the dielectric-coated valve action metal sheets 4 (more specifically, in the gaps between the dielectric-coated valve action metal sheet 4 and the conductive base 9) and on the outer surface of the laminated body 5 at the cathode layer forming parts 1b. The continuous layer is formed by, for example, immersing the cathode layer forming parts 1b covered with the dielectric coating 3 together with the conductive bases 9 in a raw material solution of the conductive polymer up to the level below the insulating member 13 in a state where the valve action metal bases 1 are hung by holding the anode lead part 1a side thereof (at this time, the conductive bases 9 are held between the dielectric-coated valve action metal sheets 4 by engagement with the joint Y in a direction perpendicular to the joint Y or, when the conductive bases 9 are fixed by the insulating member 13 at their tips, by the insulating member 13).

It is to be noted that in the microscopic sense, there is a case where part not filled with the solid electrolyte layer 7 is inevitably present in the gaps between the dielectric-coated valve action metal sheets 4 or part not covered with the solid electrolyte layer 7 is inevitably present on the outer surface of the laminated body 5. However, even when such part not filled or covered with the solid electrolyte layer 7 is present, there is no problem as long as the electrical and mechanical characteristics of the solid electrolyte capacitor are at acceptable levels.

On the other hand, the dielectric-coated valve action metal sheets 4 can be more reliably covered with (or brought into contact with) the solid electrolyte layer 7 when each of the conductive bases 9 has a plurality of openings (not for joint) formed at positions other than the position corresponding to the joint Y. The use of such conductive bases 9 makes it possible to allow the raw material solution of conductive polymer to easily enter the gaps between the dielectric-coated valve action metal sheets 4 and therefore to sufficiently supply the raw material solution of the solid electrolyte layer 7 to the gaps. Examples of such a conductive base 9 having a plurality of openings include a metal mesh sheet, one made from metal fibers, and one made from metal-coated carbon fibers.

Examples of the conductive polymer constituting the solid electrolyte layer 7 include, but are not limited to, polymers containing, as a repeating unit, a structure represented by a thiophene skeleton-containing compound, a polycyclic sulfide skeleton-containing compound, a pyrrole skeleton-containing compound, a furane skeleton-containing compound, or an aniline skeleton-containing compound.

As the raw material solution of conductive polymer, any suitable solution can be used. For example, two solutions, that is, a monomer-containing solution and a solution containing an oxidant for polymerization and, if necessary, a dopant may be used. In this case, the cathode layer forming parts 1b covered with the dielectric coating 3 are immersed in one of the solutions and then in the other solution and, if necessary, this process is repeated. However, the present invention is not limited thereto, and the cathode layer forming parts 1b covered with the dielectric coating 3 may be immersed in one solution containing, for example, a monomer, an oxidant for polymerization, and, if necessary, a dopant.

Then, as shown in FIG. 1, the cathode extraction layer 11 that covers the outer surface of the solid electrolyte layer 7 is formed. The cathode extraction layer 11 can be generally formed in the following manner. A carbon paste is applied onto the solid electrolyte layer 7 so as to cover the outer surface of the solid electrolyte layer 7 and is dried to form a carbon-containing layer 11a, and then a silver paste is applied onto the carbon-containing layer 11a so as to cover the outer surface of the carbon-containing layer 11a and is dried to form a silver-containing layer 11b.

As a result, the anode lead parts 1a of the valve action metal bases 1 are exposed to the outside of the solid electrolyte layer 7 and the cathode extraction layer 11 in a state where they are electrically insulated from the solid electrolyte layer 7 and the cathode extraction layer 11 by the insulating member 13.

Then, the anode lead parts 1a of the valve action metal bases 1 are connected to the anode terminal 15, and on the other hand, the cathode extraction layer 11 is connected to the cathode terminal 17. As the anode terminal 15 and the cathode terminal 17, for example, lead frames or the like can be used. Sealing is performed using the insulating resin 19 such as an epoxy resin in a state where at least part of the anode terminal 15 and at least part of the cathode terminal 17 are exposed to the outside of the insulating resin 19.

In this way, the solid electrolytic capacitor 20 shown in FIG. 1 is obtained. According to the first production method, the gaps between the dielectric-coated valve action metal sheets 4 constituting the laminated body 5 and the outer surface of the laminated body 5 can be filled and covered with the solid electrolyte layer 7 at one time because the solid electrolyte layer 7 is formed as a continuous layer.

(Second Production Method)

The second method for producing the solid electrolytic capacitor will be described with reference to FIGS. 3A to 3D.

In FIGS. 3A to 3D, the same reference numerals as those in FIGS. 1 to 2D denote the same elements as described above with reference to the solid electrolytic capacitor 20. Hereinbelow, differences between the first and second production methods will be mainly described, and unless otherwise specified, the description of the first production method is equally applicable to the second production method.

First, the dielectric-coated valve action metal sheets 4 are prepared in the same manner as in the first production method. Each of the dielectric-coated valve action metal sheets 4 includes the valve action metal base 1 and the dielectric coating 3 that covers the surface of the valve action metal base 1 at least the cathode layer forming part 1b. Then, the insulating member 13 is formed so as to cover the separating part 1c (which may or may not be covered with the dielectric coating) of the valve action metal base 1 of each of the dielectric-coated valve action metal sheets 4 to separate the anode lead part 1a and the cathode layer forming part 1b from each other.

Figure 3A:
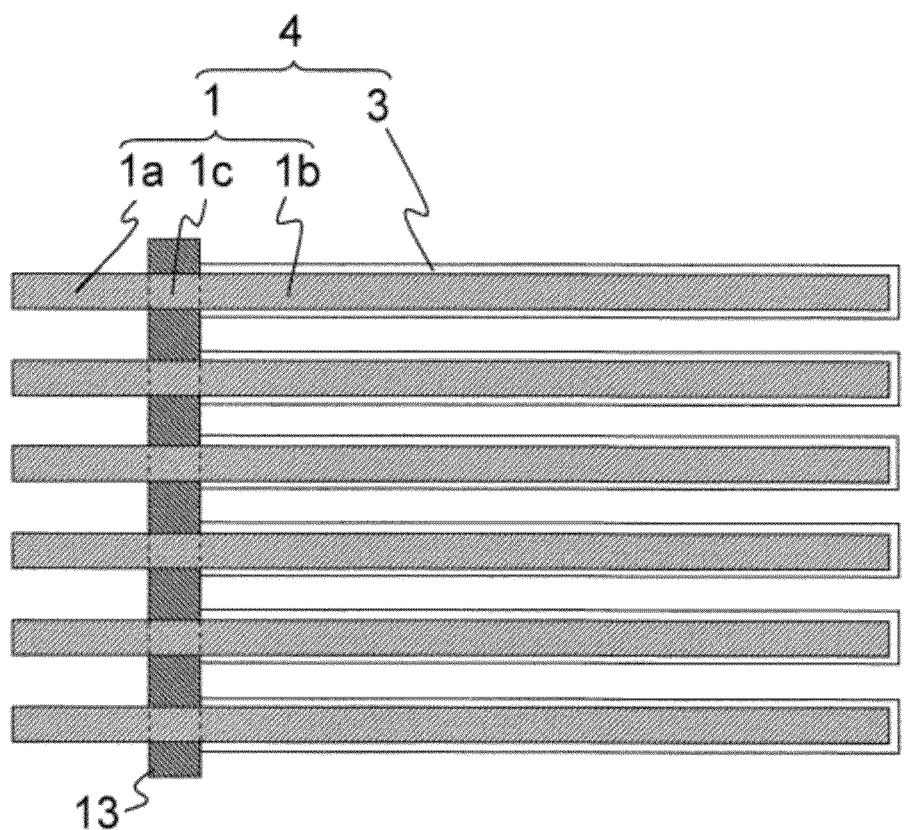
FIG. 3A is a diagram for explaining a step of a second method for producing the solid electrolytic capacitor according to the embodiment of the present invention.

Then, as shown in FIG. 3A, the dielectric-coated valve action metal sheets 4 are laminated together. The second production method is different from the first production method in that the conductive bases 9 are not interposed between the dielectric-coated valve action metal sheets 4 during lamination of the dielectric-coated valve action metal sheets 4.

Figure 3B:
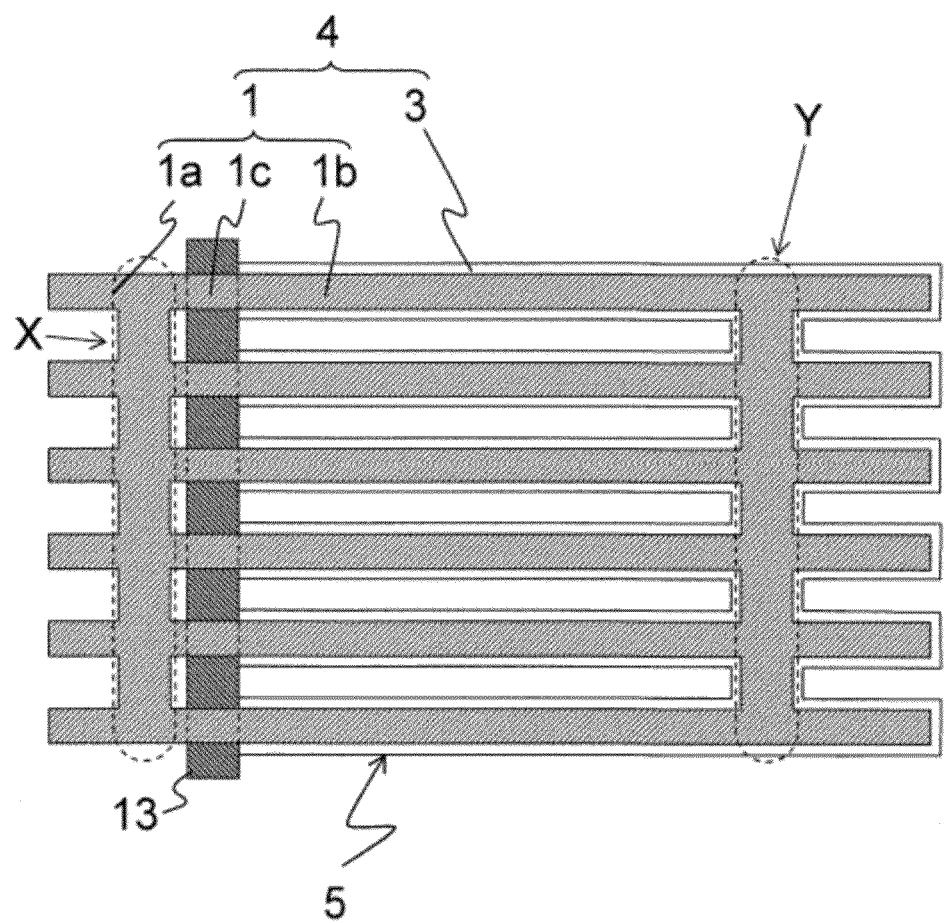
FIG. 3B is a diagram for explaining a step of the second method for producing the solid electrolytic capacitor according to the embodiment of the present invention.

Then, as shown in FIG. 3B, the adjacent valve action metal bases 1 of the laminated dielectric-coated valve action metal sheets 4 are joined together at the joints X and Y to obtain the laminated body 5 of the dielectric-coated valve action metal sheets 4. When the surface of the joint of the valve action metal bases 1 is covered with the dielectric coating 3 after the valve action metal bases 1 are joined together, the joint of the valve action metal bases 1 is electrically insulated from the solid electrolyte layer 7 (which is formed in a later step) and the conductive bases 9 (which are placed in a later step) by the dielectric coating 3. On the other hand, when the valve action metal bases 1 are exposed at the surface of the joint, the operation of electrically insulating the joint from the solid electrolyte layer 7 and the conductive bases 9 is performed. The operation of joining the valve action metal bases 1 together and the operation of electrically insulating the joint can be performed in the same manner as in the first production method.

Figure 3C:
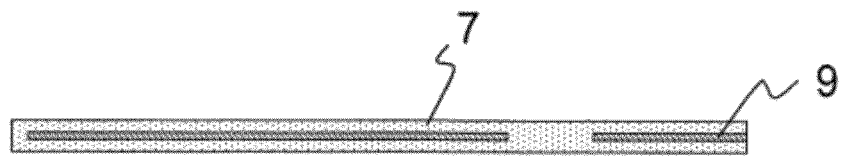
FIGS. 3C(a) and 3C(b) are diagrams for explaining a step of the second method for producing the solid electrolytic capacitor according to the embodiment of the present invention, wherein FIG. 3C(a) is a schematic sectional view of a conductive base and FIG. 3C(b) is a schematic top view of the conductive base.
Figure 3C:
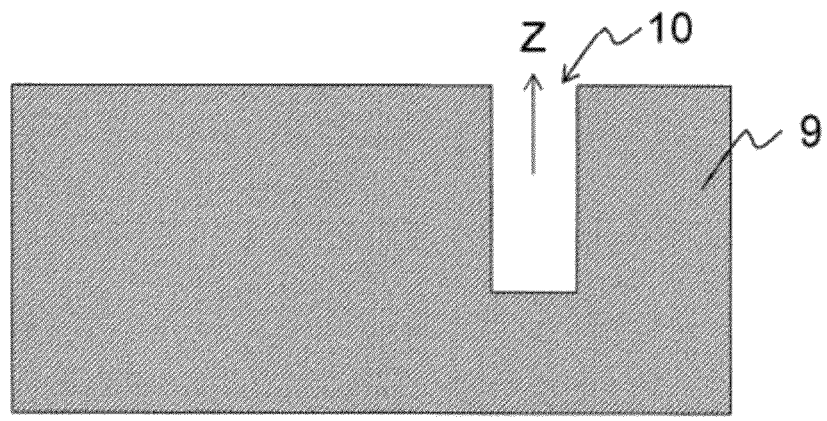

At the same time, as shown in FIG. 3C(a), the solid electrolyte layer 7 is formed on the surface of each of the conductive bases 9.

As shown in, for example, FIG. 3C(b), each of the conductive bases 9 to be used has a slot-shaped opening 10 at a position corresponding to the joint Y. The direction in which the slot-shaped opening 10 is open (or the position of the end of a notch of the opening 10 indicated by the arrow-shaped tip of a lead line in FIG. 3C(b)) is determined according to an insertion direction Z that will be described later.

The solid electrolyte layer 7 can be formed by forming a continuous layer made of a conductive polymer on the outer surface of the conductive base 9 by immersing the entire conductive base 9 in a raw material solution of the conductive polymer.

Figure 3D:
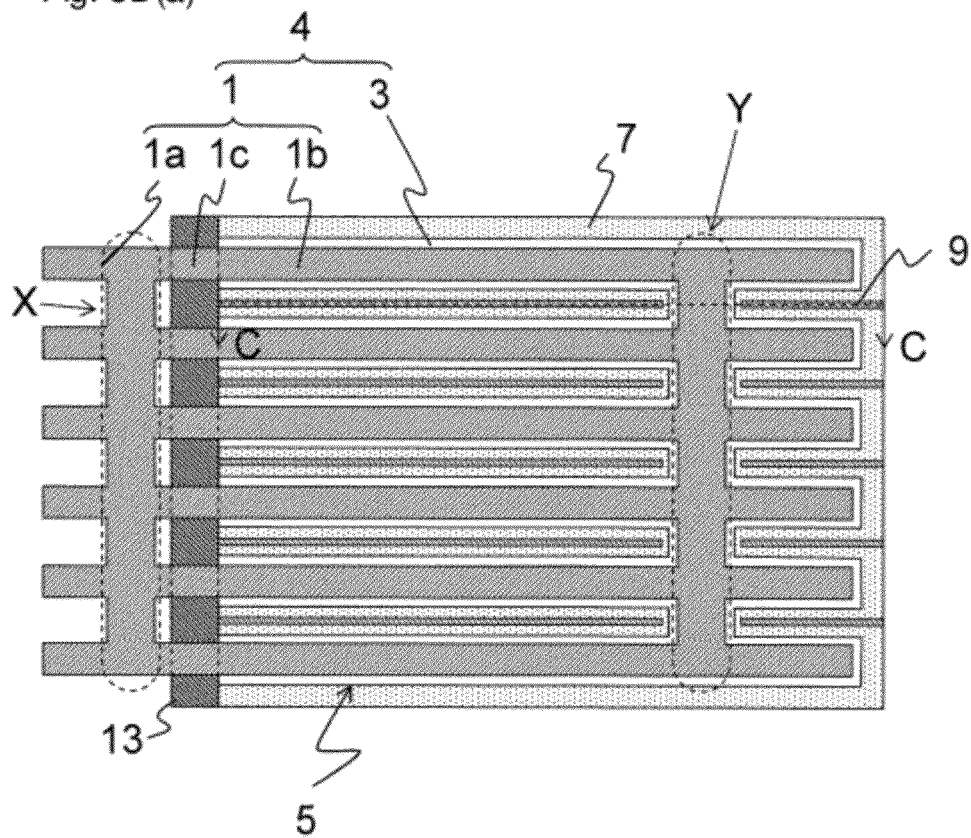
FIGS. 3D(a) and 3D(b) are diagrams for explaining a step of the second method for producing the solid electrolytic capacitor according to the embodiment of the present invention, wherein FIG. 3D(a) is a schematic sectional view of a laminated body and FIG. 3D(b) is a schematic top view of the laminated body virtually taken along the C-C line in FIG. 3D(a)
Figure 3D:
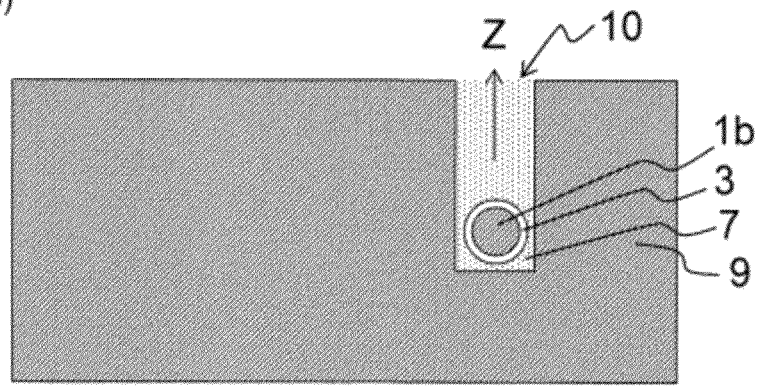

Then, as shown in FIG. 3D(a), the conductive bases 9 each having the solid electrolyte layer 7 formed on the surface thereof are inserted between the adjacent dielectric-coated valve action metal sheets 4 constituting the laminated body 5. Each of the conductive bases 9 is inserted in a direction perpendicular to the cross-section shown in FIG. 3D(a), more specifically, in the insertion direction Z shown in FIG. 3D(b) in such a manner that the joint Y is inserted into the slot-shaped opening 10 of the conductive base 9. It is to be noted that the insertion direction is not limited thereto, and the direction in which the slot-shaped opening 10 is open may be appropriately changed and the insertion direction may also be appropriately changed. For example, each of the conductive bases 9 may be turned when inserted between the adjacent dielectric-coated valve action metal sheets 4.

In addition, the solid electrolyte layer 7 is formed as a continuous layer that fills the gaps between the dielectric-coated valve action metal sheet 4 and the conductive base 9 adjacent to each other and covers the outer surface of the laminated body 5 at the cathode layer forming parts 1b. Such a solid electrolyte layer 7 can be formed by forming a continuous layer made of a conductive polymer in the gaps between the dielectric-coated valve action metal sheet 4 and the conductive base 9 and on the outer surface of the laminated body 5 at the cathode layer forming parts 1b. The continuous layer is formed by, for example, immersing the cathode layer forming parts 1b covered with the dielectric coating 3 together with the conductive bases 9 covered with the solid electrolyte layer 7 previously formed on the surface thereof in a raw material solution of the conductive polymer up to the level below the insulating member 13 in a state where the valve action metal bases 1 are hung by holding the anode lead part 1a side thereof (at this time, the conductive bases 9 covered with the solid electrolyte layer 7 previously formed on the surface thereof are held between the dielectric-coated valve action metal sheets 4 by engagement with the joint Y in a direction perpendicular to the joint Y). The entire or part of the solid electrolyte layer 7 in the gaps between the dielectric-coated valve action metal sheet 4 and the conductive base 9 is one previously formed on the surface of the conductive bases 9 in the previous step described above with reference to FIG. 3C.

In this way, the solid electrolyte layer 7 is formed as a continuous layer that fills the gaps between the dielectric-coated valve action metal sheet 4 and the conductive base 9 and covers the outer surface of the laminated body 5 at the cathode layer forming parts 1b of the valve action metal bases 1. The anode lead parts 1a of the valve action metal bases 1 are left exposed without filling the gaps between the anode lead parts 1a with the solid electrolyte layer 7 and without covering the surface of the anode lead parts 1a with the solid electrolyte layer 7.

Then, the cathode extraction layer 11 is formed so as to cover the outer surface of the solid electrolyte layer 7 in the same manner as in the first production method. Then, the anode lead parts 1a of the valve action metal bases 1 are connected to the anode terminal 15, and on the other hand, the cathode extraction layer 11 is connected to the cathode terminal 17. Then, sealing is performed using the insulating resin 19 such as an epoxy resin.

In this way, the solid electrolytic capacitor 20 shown in FIG. 1 is obtained. According to the second production method, larger capacitance and lower ESR can be achieved at the same time.

(Third Production Method)

The third method for producing the solid electrolytic capacitor will be described with reference to FIGS. 4A to 4C.

Figure 4A:
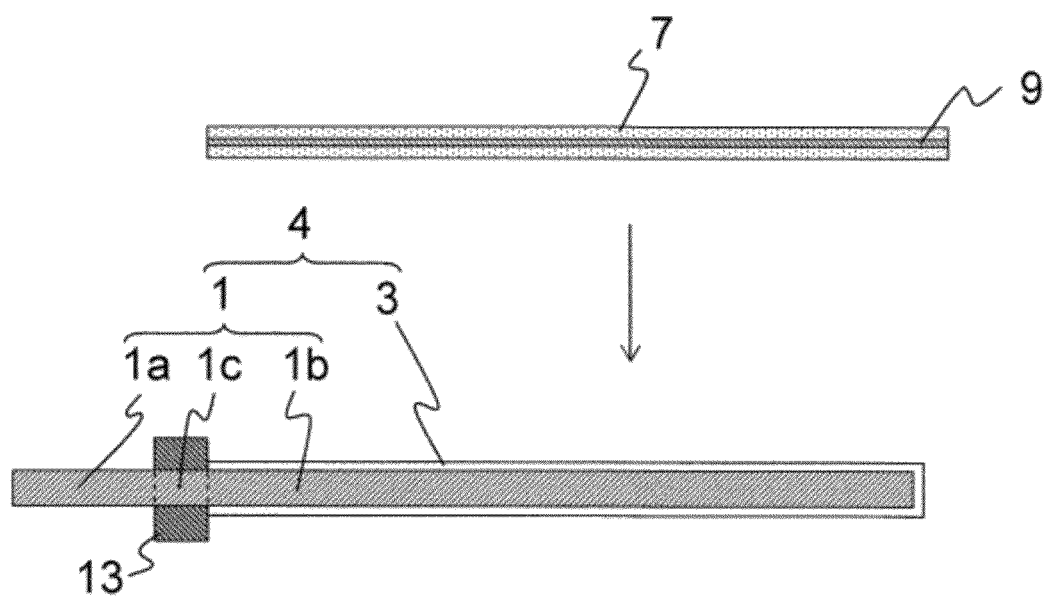
FIG. 4A is a diagram for explaining a step of a third method for producing the solid electrolytic capacitor according to the embodiment of the present invention.
Figure 4B:
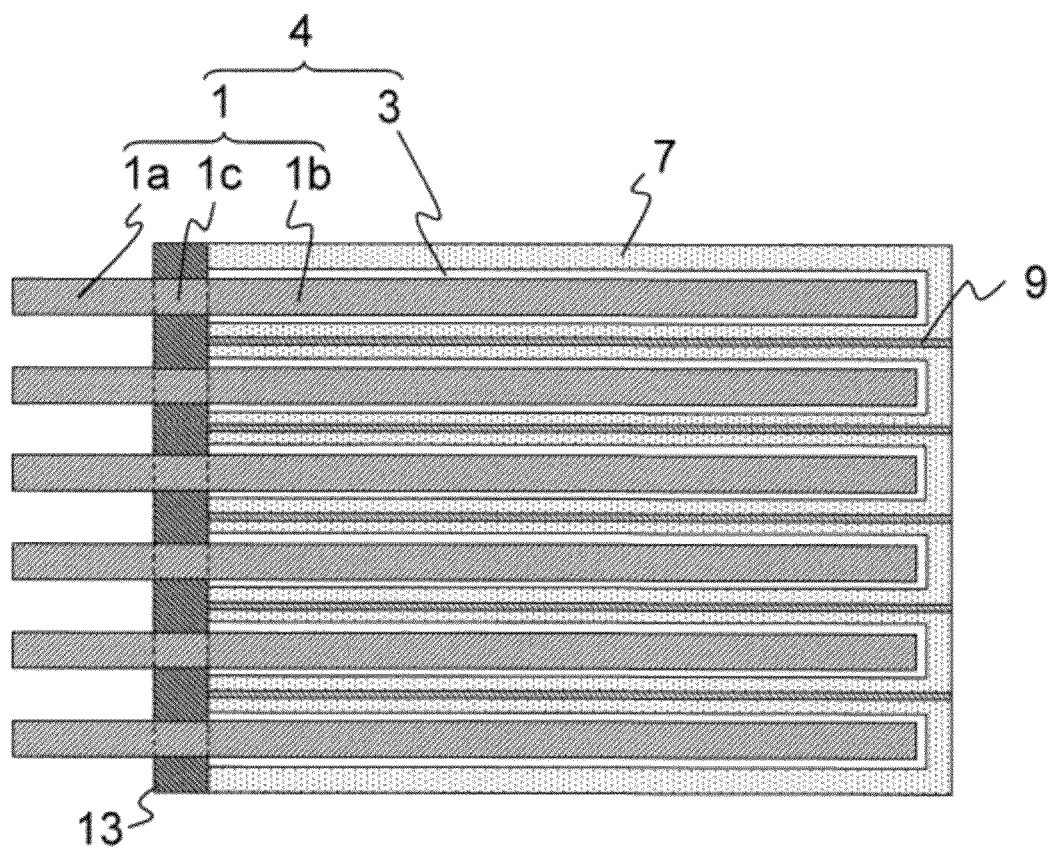
FIG. 4B is a diagram for explaining a step of the third method for producing the solid electrolytic capacitor according to the embodiment of the present invention.
Figure 4C:
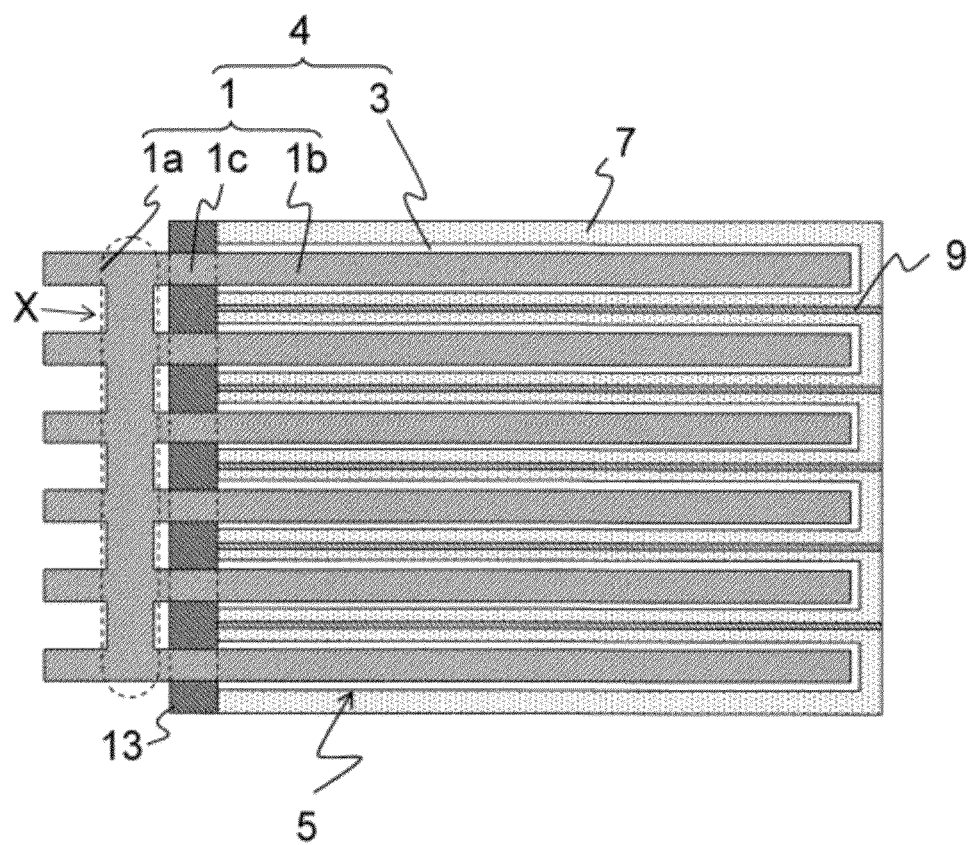
FIG. 4C is a diagram for explaining a step of the third method for producing the solid electrolytic capacitor according to the embodiment of the present invention.

In FIGS. 4A to 4C, the same reference numerals as those in FIGS. 1 to 3D denote the same elements as described above with reference to the solid electrolytic capacitor 20. Hereinbelow, differences between the first and third production methods will be mainly described, and unless otherwise specified, the description of the first production method is equally applicable to the third production method.

The third production method is a method for producing a modified example of the solid electrolytic capacitor 20 shown in FIG. 1 different from the solid electrolytic capacitor 20 only in that the joint Y is omitted.

First, as shown in FIG. 4A, the dielectric-coated valve action metal sheets 4 are prepared in the same manner as in the first production method. Each of the dielectric-coated valve action metal sheets 4 includes the valve action metal base 1 and the dielectric coating 3 that covers the surface of the valve action metal base 1 at least the cathode layer forming part 1b. Then, the insulating member 13 is formed so as to cover the separating part 1c (which may or may not be covered with the dielectric coating) of the valve action metal base 1 of each of the dielectric-coated valve action metal sheets 4 to separate the anode lead part 1a and the cathode layer forming part 1b from each other.

At the same time, as shown in FIG. 4A, the solid electrolyte layer 7 is formed on the surface of each of the conductive bases 9.

The conductive bases 9 used in the third production method are different from those used in the first production method in that they do not have an opening at a position corresponding to the joint Y.

The solid electrolyte layer 7 can be formed in the same manner as in the second production method, that is, by forming a continuous layer made of a conductive polymer on the outer surface of the conductive base 9 by immersing the entire conductive base 9 in a raw material solution of the conductive polymer.

Then, as shown in FIG. 4B, the dielectric-coated valve action metal sheets 4 are laminated on top of one another in such a manner that the conductive bases 9 each having the solid electrolyte layer 7 formed on the surface thereof are interposed between the adjacent dielectric-coated valve action metal sheets 4 (by, for example, repeating the operation of placing the conductive base 9 having the solid electrolyte layer 7 formed on the surface thereof on the dielectric-coated valve action metal sheet 4 as shown by an arrow in FIG. 4A).

Further, the solid electrolyte layer 7 is formed in the same manner as in the second production method as a continuous layer that fills the gaps between the dielectric-coated valve action metal sheet 4 and the conductive base 9 adjacent to each other and covers the outer surface of the laminated body 5 at the cathode layer forming parts 1b. Such a solid electrolyte layer 7 can be formed by forming a continuous layer made of a conductive polymer in the gaps between the dielectric-coated valve action metal sheet 4 and the conductive base 9 and on the outer surface of the laminated body 5. The continuous layer is formed by, for example, immersing the cathode layer forming parts 1b covered with the dielectric coating 3 together with the conductive bases 9 covered with the solid electrolyte layer 7 previously formed on the surface thereof in a raw material solution of the conductive polymer up to the level below the insulating member 13 in a state where the valve action metal bases 1 are hung by holding the anode lead part 1a side thereof (at this time, the conductive bases 9 covered with the solid electrolyte layer 7 previously formed on the surface thereof are held between the dielectric-coated valve action metal sheets 4 by engagement with the joint Y in a direction perpendicular to the joint Y or, when the conductive bases 9 are fixed by the insulating member 13 at their tips, by the insulating member 13). The entire or part of the solid electrolyte layer 7 in the gaps between the dielectric-coated valve action metal sheet 4 and the conductive base 9 is one previously formed on the surface of the conductive bases 9 in the previous step described above with reference to FIG. 4A.

In this way, the solid electrolyte layer 7 is formed as a continuous layer that fills the gaps between the dielectric-coated valve action metal sheet 4 and the conductive base 9 and covers the outer surface of the laminated body 5 at the cathode layer forming parts 1b of the valve action metal bases 1. The anode lead parts 1a of the valve action metal bases 1 are left exposed without filling the gaps between the anode lead parts 1a with the solid electrolyte layer 7 and without covering the surface of the anode lead parts 1a with the solid electrolyte layer 7.

Then, as shown in FIG. 4C, the adjacent valve action metal bases 1 of a plurality of the laminated dielectric-coated valve action metal sheets 4 are joined together by the joint X at their anode lead parts 1a to obtain the laminated body 5 of the dielectric-coated valve action metal sheets 4. The joining between the adjacent valve action metal bases 1 can be performed in the same manner as in the first production method.

Then, the cathode extraction layer 11 is formed in the same manner as in the first production method to cover the outer surface of the solid electrolyte layer 7. Then, the anode lead parts 1a of the valve action metal bases 1 are connected to the anode terminal 15, and on the other hand, the cathode extraction layer 11 is connected to the cathode terminal 17. Then, sealing is performed using the insulating resin 19 such as an epoxy resin.

In this way, a modified example of the solid electrolytic capacitor 20 shown in FIG. 1 (wherein the joint Y is omitted) is obtained. According to the third production method, larger capacitance and lower ESR can be achieved at the same time.

Second Embodiment

Figure 5:
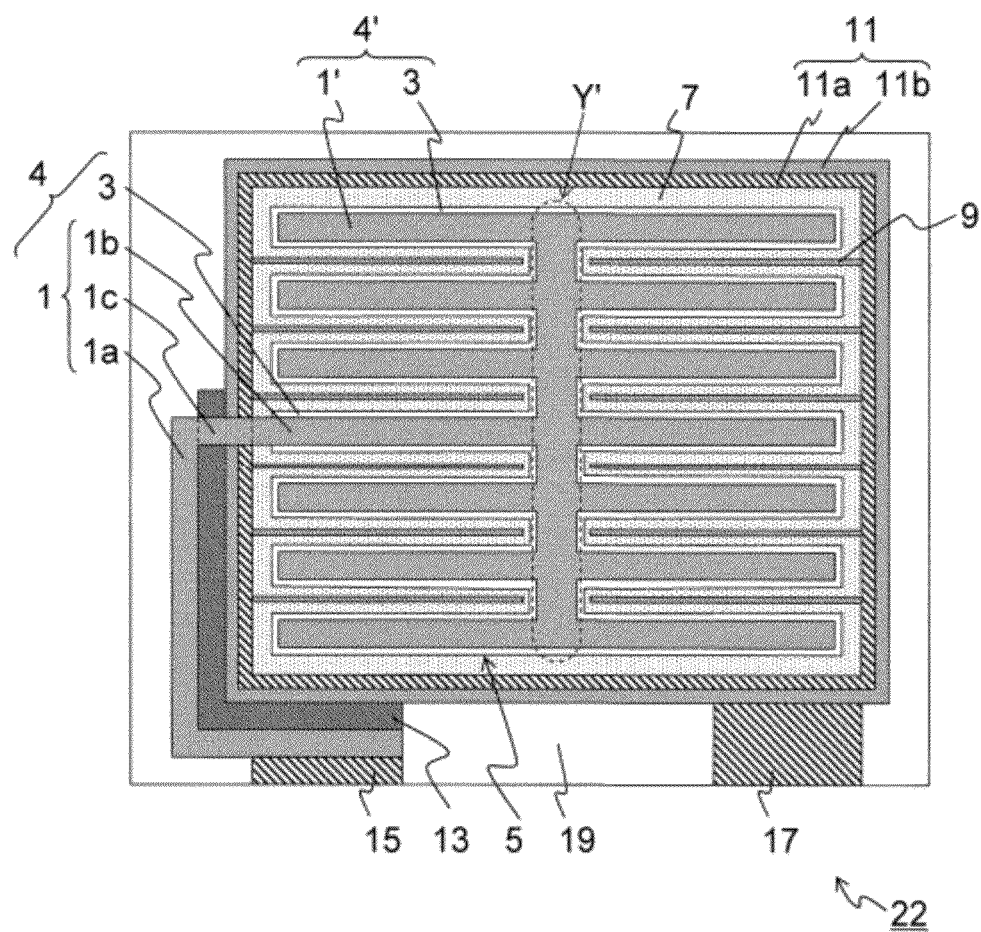
FIG. 5 is a schematic sectional view of a solid electrolytic capacitor according to another embodiment of the present invention.

A solid electrolytic capacitor according to another embodiment of the present invention and a method for producing the same will be described in detail with reference to FIG. 5. In FIG. 5, the same reference numerals as those in FIGS. 1 to 4C denote the same elements as described above with reference to the first embodiment. Hereinbelow, differences between the first and second embodiments will be mainly described, and unless otherwise specified, the description of the first embodiment is equally applicable to the second embodiment.

As schematically shown in FIG. 5, a solid electrolytic capacitor 22 according to this embodiment includes the laminated body 5, the solid electrolyte layer 7, and the conductive bases 9. The laminated body 5 is obtained by laminating the dielectric-coated valve action metal sheet 4 including the valve action metal base 1 and the dielectric coating 3 and a plurality of dielectric-coated valve action metal sheets 4' each including a valve action metal base 1' and the dielectric coating 3 (in this embodiment shown in FIG. 5, the total number of the dielectric-coated valve action metal sheets 4 and 4' is seven, but is not limited thereto) and joining together the adjacent valve action metal bases 1 at a joint Y'. According to this embodiment, only the one valve action metal base 1 among the valve action metal bases 1 and 1' (and, by extension, among the dielectric-coated valve action metal sheets 4 and 4') is relatively long and has the anode lead part 1a, the cathode layer forming part 1b, and the separating part 1c provided between them. The anode lead part 1a is exposed without being covered with the solid electrolyte layer 7 in a state where it is electrically insulated from the solid electrolyte layer 7 and the cathode extraction layer 11 by the insulating member 13. The other valve action metal bases 1' have substantially the same length, and the description of the cathode layer forming part 1b of the first embodiment is equally applicable to the valve action metal base 1' except that the entire valve action metal base 1' serves as a cathode layer forming part and is provided in the solid electrolyte layer 7.

The dielectric-coated valve action metal sheet 4 is formed by covering the surface of the relatively-long valve action metal base 1 having the anode lead part 1a with the dielectric coating 3 at least the cathode layer forming part 1b.

Each of the other dielectric-coated valve action metal sheets 4' is formed by covering the entire surface of the relatively-short valve action metal base 1' with the dielectric coating 3. The dielectric-coated valve action metal sheet 4 is interposed between the dielectric-coated valve action metal sheets 4' (more specifically, in such a manner that the dielectric-coated valve action metal sheet 4 is located in the center of the laminated body 5) (in this embodiment shown in FIG. 5, the relatively-long dielectric-coated valve action metal sheet 4 is interposed between the upper three relatively-short dielectric-coated valve action metal sheets 4' and the lower three relatively-short dielectric-coated valve action metal sheets 4'), but this embodiment is not limited thereto. It is to be noted that when the relatively-long dielectric-coated valve action metal sheet 4 having the anode lead part 1a is located in the center of the laminated body 5, stress applied to the entire dielectric-coated valve action metal sheets can be more evenly distributed so that the dielectric-coated valve action metal sheets are more stably joined together.

The joint Y' may be the same as the joint Y described above with reference to the first embodiment. However, the joint Y' is the only joint provided in this embodiment, and is therefore preferably formed on or near a line bisecting the width of the cathode layer forming part 1b of the valve action metal base 1 and in the center of the cathode layer forming part 1b in the longitudinal direction to join the valve action metal bases together electrically and mechanically stably.

Such a solid electrolytic capacitor 22 can be produced in the same manner as in the first and second production methods described above with reference to the first embodiment except that the one relatively-long dielectric-coated valve action metal sheet 4 and the other relatively-short dielectric-coated valve action metal sheets 4' are prepared, laminated in an appropriate manner, and joined together at the joint Y' to obtain a laminated body, and that, after the solid electrolyte layer 7 is formed to fill the gaps between the dielectric-coated valve action metal sheets of the laminated body and cover the outer surface of the laminated body and the cathode extraction layer 11 is formed to cover the outer surface of the solid electrolyte layer 7, the insulating member 13 is formed so that the anode lead part 1a of the one relatively-long dielectric-coated valve action metal sheet 4 is exposed to the outside in a state where it is electrically insulated from the solid electrolyte layer 7 and the cathode extraction layer 11 by the insulating member 13 and the anode lead part 1a is curved along the insulating member 13.

The solid electrolytic capacitor 22 according to this embodiment has the same effects as the solid electrolytic capacitor according to the first embodiment. In addition, in the solid electrolytic capacitor 22 according to this embodiment, only the one dielectric-coated valve action metal sheet 4 among the dielectric-coated valve action metal sheets 4 and 4' has the anode lead part 1a. The anode lead part 1a does not contribute to the formation of capacitance. Therefore, according to this embodiment, an area occupied by the anode lead part 1a that does not contribute to the formation of capacitance can be made smaller than that of the solid electrolytic capacitor according to the first embodiment, which makes it possible to produce a solid electrolytic capacitor having larger capacitance per unit volume.

EXAMPLES

Some examples will be described below for the purpose of exemplifying the method for producing a solid electrolytic capacitor according to the present invention, but the present invention is not limited to these examples.

Example 1

A solid electrolytic capacitor of Example 1 is produced by the first production method for producing the solid electrolytic capacitor 20 according to the first embodiment shown in FIG. 1 described above with reference to FIGS. 2A to 2D.

As dielectric-coated valve action metal sheets, 6 aluminum foil sheets each having two main surfaces (upper and lower surfaces) covered with an oxide coating are prepared. It is to be noted that these aluminum foil sheets are subjected to surface roughening by etching before formation of the oxide coating. Each of the dielectric-coated valve action metal sheets has a length of 12 mm, a width of 3.5 mm, and a thickness of 100 µm. It is to be noted that the side surfaces of these dielectric-coated valve action metal sheets are not covered with the oxidation coating.

Then, a polyimide resin (manufactured by Ube Industries, Ltd.) is applied onto a part of the two main surfaces of each of the dielectric-coated valve action metal sheets so as to cover an area (i.e., a separating part) which has a length of 0.8 mm and a width of 3.5 mm and whose center is 6.4 mm away from one of the ends of the dielectric-coated valve action metal sheet. Then, the polyimide resin is cured by drying at 180° C. for 1 hour. The cured polyimide resin serves as an insulating member. A part of each of the dielectric-coated valve action metal sheets not covered with the polyimide resin and extending from the one end of the dielectric-coated valve action metal sheet to a position 6 mm away from the one end (length 6 mm width 3.5 mm) serves as a cathode layer forming part.

At the same time, five aluminum foils each having a length of 7 mm, a width of 3.7 mm, and a thickness of 30 μm are prepared as conductive bases.

The prepared 6 dielectric-coated valve action metal sheets are laminated in such a manner that each of the conductive bases is interposed between the adjacent dielectric-coated valve action metal sheets to obtain a laminated body. At this time, the dielectric-coated valve action metal sheets and the conductive bases are alternately laminated in such a manner that the one ends (i.e., the cathode layer forming part-side ends) of the dielectric-coated valve action metal sheets are aligned with one another and the other ends of the conductive bases are slightly overlapped with the separating parts of the dielectric-coated valve action metal sheets and that lines bisecting the width of the dielectric-coated valve action metal sheets and lines bisecting the width of the conductive bases all overlap with one another.

The adjacent dielectric-coated valve action metal sheets are joined together by resistance welding at positions 2 mm and 9.4 mm away from the one ends thereof located on a line bisecting the width of the laminated body when seen from above. The resistance welding can be performed using a circular electrode having a diameter of 1 mm. Referring to FIG. 1, a joint located at the former position corresponds to the joint Y and a joint located at the latter position corresponds to the joint X. The area of the cross section of each of the joints taken along the A-A line is 0.5 mm².

Then, the laminated body is subjected to anode oxidation treatment. More specifically, the cathode layer forming parts covered with the dielectric coating of the dielectric-coated valve action metal sheets constituting the laminated body are immersed in a 9 mass % aqueous ammonium adipate solution at 65° C. (in a state where the conductive bases are held between the dielectric-coated valve action metal sheets), a voltage of 3.5 V is applied thereto for 10 minutes, and then the cathode layer forming parts are washed with water and dried. As a result, the side surfaces of the dielectric-coated valve action metal sheets and exposed aluminum of the joint are covered with an oxide coating, that is, the entire surface of aluminum (valve action metal bases) is reliably covered with an oxide coating at the cathode layer forming parts.

Then, the cathode layer forming parts (i.e., the parts each having a length of 6 mm and a width of 3.5 mm) of the laminated body are immersed in an isopropanol solution (solution 1) containing 3,4-ethylenedioxythiophene, and are then pulled out of the solution and allowed to stand (without drying). Then, the cathode layer forming parts of the laminated body are immersed also in an aqueous solution containing ammonium persulfate (solution 2), and are then pulled out of the solution and dried. As a result, 3,4-ethylene dioxythiophene is oxidatively polymerized so that a solid electrolyte layer made of polyethylene dioxythiophene is formed. The series of immersion in the solution 1, immersion in the solution 2, and drying is repeated 20 times. Then, the laminated body is washed with water heated to 50° C. and dried at 100° C. As a result, the solid electrolyte layer made of polyethylene dioxythiophene is formed as a continuous layer that fills the gaps between the cathode layer forming parts of the laminated body and covers the outer surface of the laminated body.

Then, a carbon paste is applied so as to cover the outer surface of the solid electrolyte layer 7 and dried to form a carbon-containing layer 11a. Then, a silver paste is applied so as to cover the outer surface of the carbon-containing layer 11a and dried to form a silver-containing layer 11b. As a result, a cathode extraction layer 11 is formed.

The anode lead parts of the valve action metal bases of the laminated body are connected to an anode lead frame (anode terminal), and on the other hand, the surface of the cathode extraction layer is connected to a cathode lead frame (cathode terminal). Then, the laminated body is sealed with an epoxy resin in such a manner that at least part of the anode lead frame and at least part of the cathode lead frame are exposed.

In this way, the solid electrolytic capacitor 20 shown in FIG. 1 is produced.

Example 2

A solid electrolytic capacitor of Example 2 uses conductive bases subjected to surface treatment for preventing oxidation.

The solid electrolytic capacitor of Example 2 is produced in the same manner as in Example 1 except that the conductive bases are changed to aluminum foils whose surface is covered with a carbon layer (Toyal Carbo (registered trademark)) manufactured by Toyo Aluminum K.K).

Comparative Example 1

A solid electrolytic capacitor of Comparative Example 1 is a comparative example for Examples 1 and 2, and is a conventional laminated solid electrolytic capacitor.

The solid electrolytic capacitor of Comparative Example 1 is produced in the same manner as in Example 1 except that the conductive bases are omitted.

The device volume, capacitance, ESR, and capacitance/volume efficiency (=capacitance/device volume) of each of the solid electrolytic capacitors produced in Examples 1 and 2 and Comparative Example 1 were determined by simulation. The simulation results are shown in Table 1.

TABLE 1

|  | Capacitance/ Volume Efficiency (mm³) | Capacitance (μf) | ESR (mΩ) | Device Volume Efficiency (μF/mm³) |
| --- | --- | --- | --- | --- |
| Example 1 | 16.7 | 239 | 11.2 | 14.4 |
| Example 2 | 16.6 | 472 | 10.8 | 28.3 |
| Comparative Example 1 | 16.4 | 475 | 20.1 | 28.9 |

As can be seen from Table 1, the solid electrolytic capacitors of Examples 1 and 2 have significantly lower ESR as compared to the conventional laminated solid electrolytic capacitor of Comparative Example 1.

The present invention is widely applicable to, but not limited to, solid electrolytic capacitors required to have low ESR.

What is claimed is:
1. A solid electrolytic capacitor comprising:
a laminated body having a plurality of dielectric-coated valve action metal sheets joined together and defining a gap therebetween, each of the plurality of dielectric-coated valve action metal sheets each including a valve action metal base having a cathode layer part and a dielectric coating covering a surface of the valve action metal base at at least the cathode layer part, and wherein at least one of the plurality of dielectric-coated valve action metal sheets has an anode lead part, and adjacent valve action metal bases of the plurality of dielectric- coated valve action metal sheets are electrically and directly joined together in the cathode layer parts by a respective first joint;

a solid electrolyte layer covering an outer surface of the laminated body at the cathode layer parts and extending into the gaps between the plurality of dielectric-coated valve action metal sheets; and a respective conductive base provided in the gaps between the plurality of dielectric-coated valve action metal sheets.

2. The solid electrolytic capacitor according to claim 1, wherein each respective conductive base has at least one opening therein, and the respective first joints are electrically insulated from the solid electrolyte layer and the respective conductive bases.

3. The solid electrolytic capacitor according to claim 2, further comprising a second joint connecting the anode lead parts of the plurality of dielectric-coated valve action metal sheets.

4. The solid electrolytic capacitor according to claim 1, wherein the respective conductive bases include a surface treatment that prevents oxidation.

5. The solid electrolytic capacitor according to claim 1, wherein the respective conductive bases have a plurality of openings, and the openings are filled with the solid electrolyte layer.

6. The solid electrolytic capacitor according to claim 1, further comprising an insulating member separating the anode lead part and the cathode layer part.

7. The solid electrolytic capacitor according to claim 1, further comprising a cathode extraction layer covering a surface of the solid electrolyte layer.

8. The solid electrolytic capacitor according to claim 7, wherein the cathode extraction layer comprises a carbon-containing layer and a silver-containing layer.

9. The solid electrolytic capacitor according to claim 1, wherein only the cathode layer part is covered with the dielectric coating.

* * * * *